United States Patent
Hefetz (10) Patent No.: US 7,723,688 B2
(45) Date of Patent: May 25, 2010

(54) METHODS AND SYSTEMS FOR AUTOMATIC BODY-CONTOURING IMAGING

(75) Inventor: Yaron Hefetz, Herzeliya (IL)

(73) Assignee: General Electric Company, Schenectady, NY (US)

( * ) Notice: Subject to any disclaimer, the term of this patent is extended or adjusted under 35 U.S.C. 154(b) by 177 days.

(21) Appl. No.: 11/415,023

(22) Filed: May 1, 2006

(65) Prior Publication Data
US 2007/0164224 A1 Jul. 19, 2007

Related U.S. Application Data

(63) Continuation-in-part of application No. 11/335,214, filed on Jan. 19, 2006, now Pat. No. 7,531,807.

(51) Int. Cl.
*G01T 1/161* (2006.01)
(52) U.S. Cl. ............................. 250/363.02; 250/363.04
(58) Field of Classification Search ............ 250/363.02, 250/363.04
See application file for complete search history.

(56) References Cited

U.S. PATENT DOCUMENTS

| | | | |
|---|---|---|---|
| 3,666,952 A | 5/1972 | McCready et al. | |
| 4,528,453 A | 7/1985 | Heller | |
| 4,956,856 A | 9/1990 | Harding | |
| 5,319,205 A * | 6/1994 | Kline et al. | ............ 250/363.04 |
| 5,448,073 A | 9/1995 | Jeanguillaume | |
| 5,486,700 A | 1/1996 | Silberklang et al. | |
| 5,594,251 A | 1/1997 | Fleury et al. | |
| 5,691,538 A * | 11/1997 | Ohike et al. | ........... 250/363.05 |
| 6,194,725 B1 | 2/2001 | Colsher et al. | |

FOREIGN PATENT DOCUMENTS

WO    WO 98/27443    6/1998

* cited by examiner

*Primary Examiner*—David P Porta
*Assistant Examiner*—Shun Lee
(74) *Attorney, Agent, or Firm*—Dean D. Small; Small Patent Law Group (57) ABSTRACT

Methods and systems for imaging a subject using an imaging system are provided. The method includes rotating a first detector and a second detector about a subject and determining a distance of the first detector and the second detector from the subject. The method further includes automatically adjusting the position of at least one of the first detector and the second detector to within a predetermined distance range if the determined distance of one of the first and second detectors is not within the predetermined distance range.

20 Claims, 9 Drawing Sheets

FIG. 9

METHODS AND SYSTEMS FOR AUTOMATIC BODY-CONTOURING IMAGING

CROSS REFERENCE TO RELATED APPLICATIONS

This application is a continuation-in-part and claims priority to U.S. patent application Ser. No. 11/335,214 filed Jan. 19, 2006 now U.S. Pat. No. 7,531,807 for "METHODS AND SYSTEMS FOR AUTOMATIC BODY-CONTOURING IMAGING," which is hereby incorporated by reference herein in its entirety.

BACKGROUND OF THE INVENTION

This invention relates generally to medical imaging systems and, more particularly, to methods and apparatus for performing automatic body-contouring imaging.

Diagnostic nuclear imaging is used to study radionuclide distribution in a subject, such as a human patient. Typically, one or more radiopharmaceuticals or radioisotopes are injected into the subject. Gamma camera detector heads, typically including a collimator, are placed adjacent to a surface of the subject to monitor and record emitted radiation. At least some known gamma camera detector heads are rotated around the subject to monitor the emitted radiation from a plurality of directions. The monitored radiation data from the plurality of directions is reconstructed into a three dimensional image representation of the radiopharmaceutical distribution within the subject.

Generally, the resolution of a gamma camera degrades with increasing distance between the imaged area/organ and the detector. Therefore, it is desirable to place the gamma camera as close as possible to the patient to facilitate minimizing the loss of resolution. At least some known imaging systems use non-circular orbits, such as oval or elliptical orbits to facilitate maintaining the detectors position close to the patient during a scan. However, a standard elliptical or oval shaped orbit may not follow the body contour of a patient as closely as possible.

When the imaging system is configured for example, with a pair of gamma cameras in an "L" mode (e.g., for SPECT imaging) as is done when imaging the heart, and other organs, the gamma cameras are configured so the cameras essentially touch one another along adjacent edges. Typical gamma cameras may comprise a large scintillation crystal of NaI optically coupled to an array of Photo-Multiplying Tubes (PMTs). Signals from the array of PMTs are processed to yield the location of the scintillation event on the crystal in what is known as an "Anger" camera. Because of this construction, the gamma camera is less responsive near an outer periphery of the detector. Further, in the "L" mode with fixed gamma cameras, the number of degrees of freedom of movement are reduced. The gamma cameras move only in a lateral motion, which may not follow the body contour of a patient as closely as possible and result in a degradation of image resolution. Thus, only one of the cameras may be positioned at an optimal or preferred distance from the patient while the other camera is positioned at a greater distance that may degrade image resolution.

BRIEF DESCRIPTION OF THE INVENTION

In one embodiment, a method of imaging a patient using an imaging system is provided. The method includes rotating a first detector and a second detector about a subject and determining a distance of the first detector and the second detector from the subject. The method further includes automatically adjusting the position of at least one of the first detector and the second detector to within a predetermined distance range if the determined distance of one of the first and second detectors is not within the predetermined distance range.

In another embodiment, a method of moving detectors of an imaging system is provided. The method includes moving a first detector of a pair of detectors configured in an L-mode configuration in a first radial direction and moving a second detector of the pair of detectors configured in an L-mode configuration in a second radial direction. The first and second radial directions defining a shift motion for the pair of detectors.

In yet another embodiment, an imaging system is provided that includes a gantry with a bore therethrough and a rotor rotatably coupled to the gantry with the rotor configured to rotate about a longitudinal axis of said bore. The imaging system further includes a pair of detectors in an L-mode configuration rotated by said rotor and configured to move in a shift motion relative to the gantry.

DETAILED DESCRIPTION OF THE INVENTION

Various embodiments of the present invention provide a nuclear medicine imaging system that allows automatic body contouring to move imaging portions, including gamma cameras of the nuclear medicine imaging system in close proximity to a subject to be imaged. A description of a nuclear medicine imaging system constructed in accordance with an exemplary embodiment of the present invention will first be provided followed by a description of the nuclear medicine imaging system in an L-mode configuration.

Figure 1:
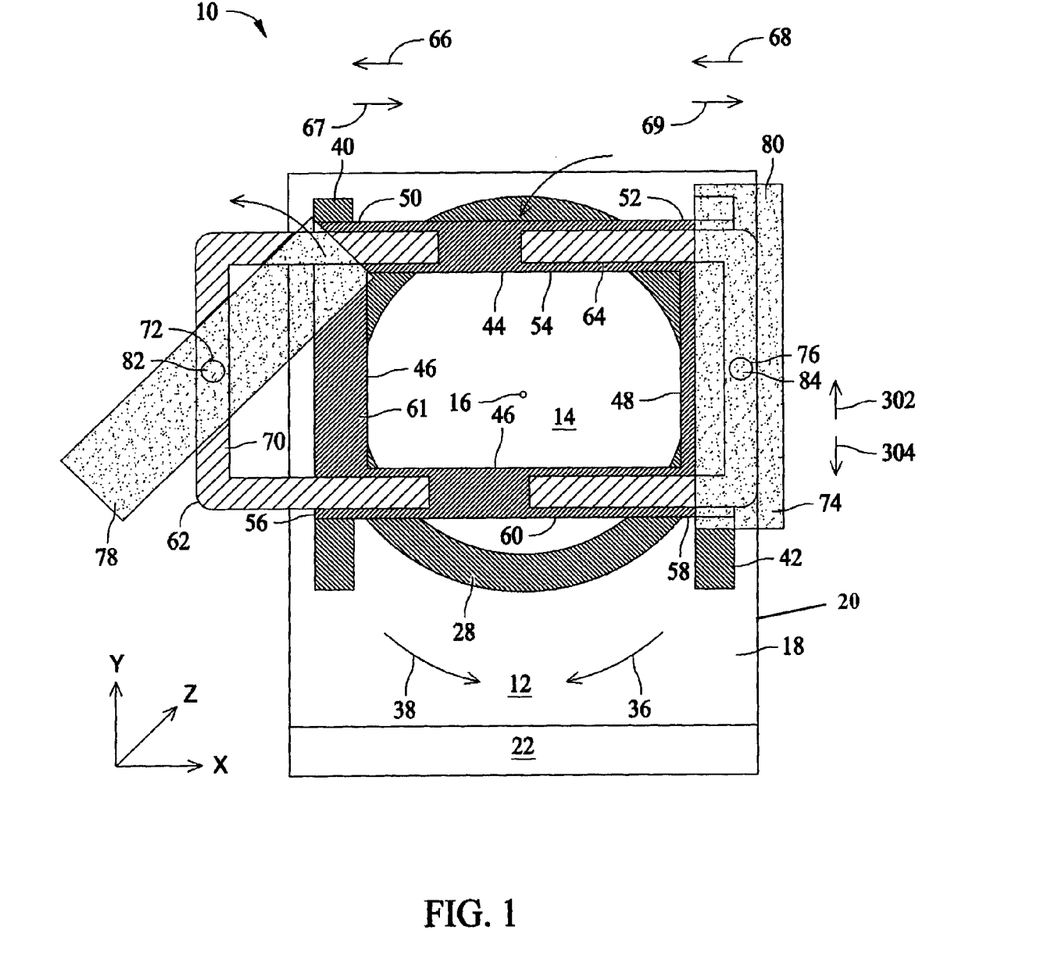
FIG. 1 is a front elevation view of a nuclear medicine imaging system constructed in accordance with an exemplary embodiment of the present invention.
Figure 2:
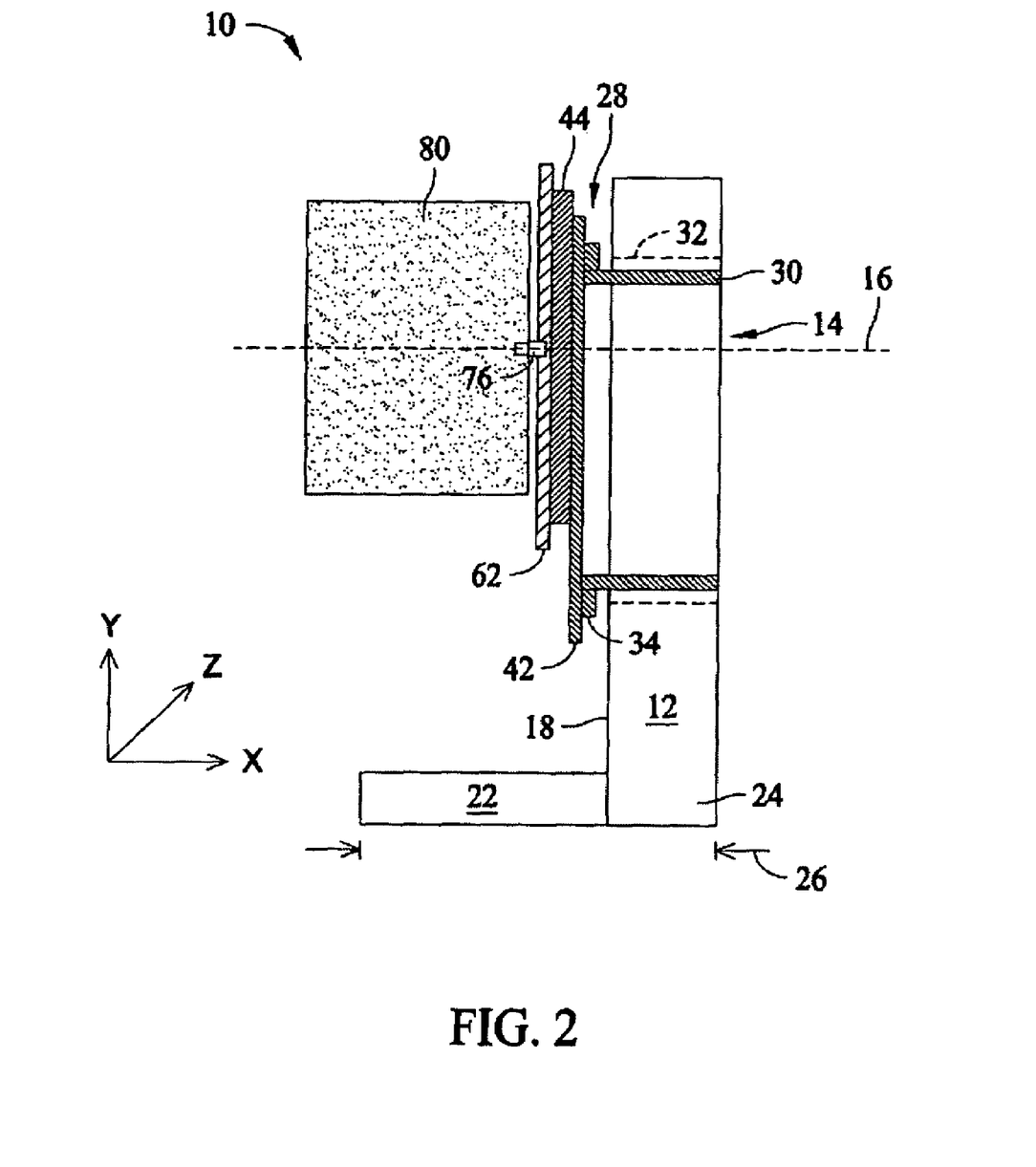
FIG. 2 is a side elevation view of the nuclear medicine imaging system shown in FIG. 1 in an L-mode configuration.

FIG. 1 is a front elevation view of an imaging system, for example, a nuclear medicine imaging system 10 constructed in accordance with an exemplary embodiment of the present invention that may be operated in different configurations including, for example, an L-mode configuration. FIG. 1 is for illustrative purposes to show the operation and different movements and configurations for the nuclear medicine imaging system 10. FIG. 2 is a side elevation view of the nuclear medicine imaging system 10 shown in FIG. 1. The nuclear medicine imaging system 10 generally includes a gantry 12 with a bore 14 therethrough. A longitudinal axis 16 of the bore 14 is oriented substantially perpendicular to the gantry 12. In the exemplary embodiment, the bore 14 is circular and extends from a front side 18 of the gantry 12 to a backside 20 of the gantry 12. The gantry 12 includes a foot portion 22 extending orthogonally from a lower end 24 of the gantry 12. The foot portion 22 is sized to provide the gantry 12 with a stable platform such that a center of gravity of the gantry 12 remains located within a footprint 26 of gantry 12.

A rotor 28 is rotatably coupled to the gantry 12 adjacent to and/or within the bore 14. The rotor 28 may include an annular portion 30 coupled to an inner surface 32 of the bore 14. The annular portion 30 extends axially toward the backside 20, at least partially into the bore 14 and extends axially toward the front side 18 to a mounting ring 34 of the gantry 12. The rotor 28 is rotatable with respect to the gantry 12 using, for example, a chain and sprocket drive coupled to a motor (not shown) internal to the gantry 12, a rack and pinion configuration, and/or a worm and toothed gear arrangement. The rotor 28 may be rotatable in a clockwise (CW) direction 36 and a counter clockwise (CCW) direction 38 (as observed from a detector side of the gantry 12), or may be rotatable in only one of the directions 36 and 38 using slip rings and/or other wireless power and communication paths to transmit electrical power and/or communication and data signals between the rotor 28 and the gantry 12. The mounting ring 34 is fixedly coupled to the annular portion 30, such that the annular portion 30 and the mounting ring 34 rotate together with respect to the gantry 12. A first brace 40 and a second brace 42 may be fixedly coupled to the mounting ring 34 substantially parallel with respect to each other and oriented along diametrically opposed, generally tangential positions along the mounting ring 34.

A lateral frame 44 is translatably coupled to the brace 40 and the brace 42 through a first leg 46 and a second leg 48. A first end 50 of the first leg 46 and a first end 52 of the second leg 48 are coupled together through a first cross leg 54 and a second end 56 of the first leg 46 and a second end 58 of the second leg 48 are coupled together through a second cross leg 60. The lateral frame 44 is translatable through, for example, a screw drive, hydraulic and/or pneumatic piston or other linear actuator (not shown) coupled between the legs 46 and 48, and the first and second braces 40 and 42, respectively. The extent of lateral translation of the lateral frame 44 may be limited to prevent an inner periphery 61 of the lateral frame 44 from approaching the longitudinal axis 16.

A first radial member 62 is translatably coupled to the cross legs 54 and 60. A second radial member 64 is translatably coupled to the cross legs 54 and 60 in an opposed orientation to the first radial member 62. The first radial member 62 and the second radial member 64 are independently translatable with respect to each other. Specifically, the first radial member 62 is translatable in a Radial-1 out direction 66 and a Radial-1 in direction 67 concurrently with the second radial member 64 being translatable in a Radial-2 in direction 68 and a Radial-2 out direction 69.

A base member 70 of the first radial member 62 includes a pivot joint 72 and a base member 74 of the second radial member 64 includes a pivot joint 76. A radiation detector, such as a gamma camera 78 may be rotatably coupled to the pivot joint 72 and a radiation detector, such as a gamma camera 80 may be rotatably coupled to the pivot joint 76. The pivot joint 72 permits gamma camera 78 to rotate about a longitudinal axis 82 of the pivot joint 72 and the pivot joint 76 permits gamma camera 80 to rotate about a longitudinal axis 84 of the pivot joint 76. The gamma cameras 78 and 80 may be rotated manually and fixed in place before each imaging scan, or may be rotated automatically during any portion of an imaging scan using an actuator (not shown). The gamma cameras 78 and 80 may be fixed during an imaging scan. In the exemplary embodiment, the gamma cameras 78 and 80 may each be configured to rotate approximately forty-five degrees with respect to alignment with the legs 46 and 48, respectively, in direction 36 and direction 38, for example, to provide an L-mode configuration.

The lateral frame 44, the first radial member 62, and the second radial member 64 together form a transaxial movement assembly that permits a rotation of the gamma cameras 78 and 80 to be non-symmetric about longitudinal axis 16. The transaxial movement assembly permits movement of the cameras 78 and 80 to any position within the x, y plane during rotation of the rotor 28 or with the rotor 28 maintained in a viewing position.

Figure 3:
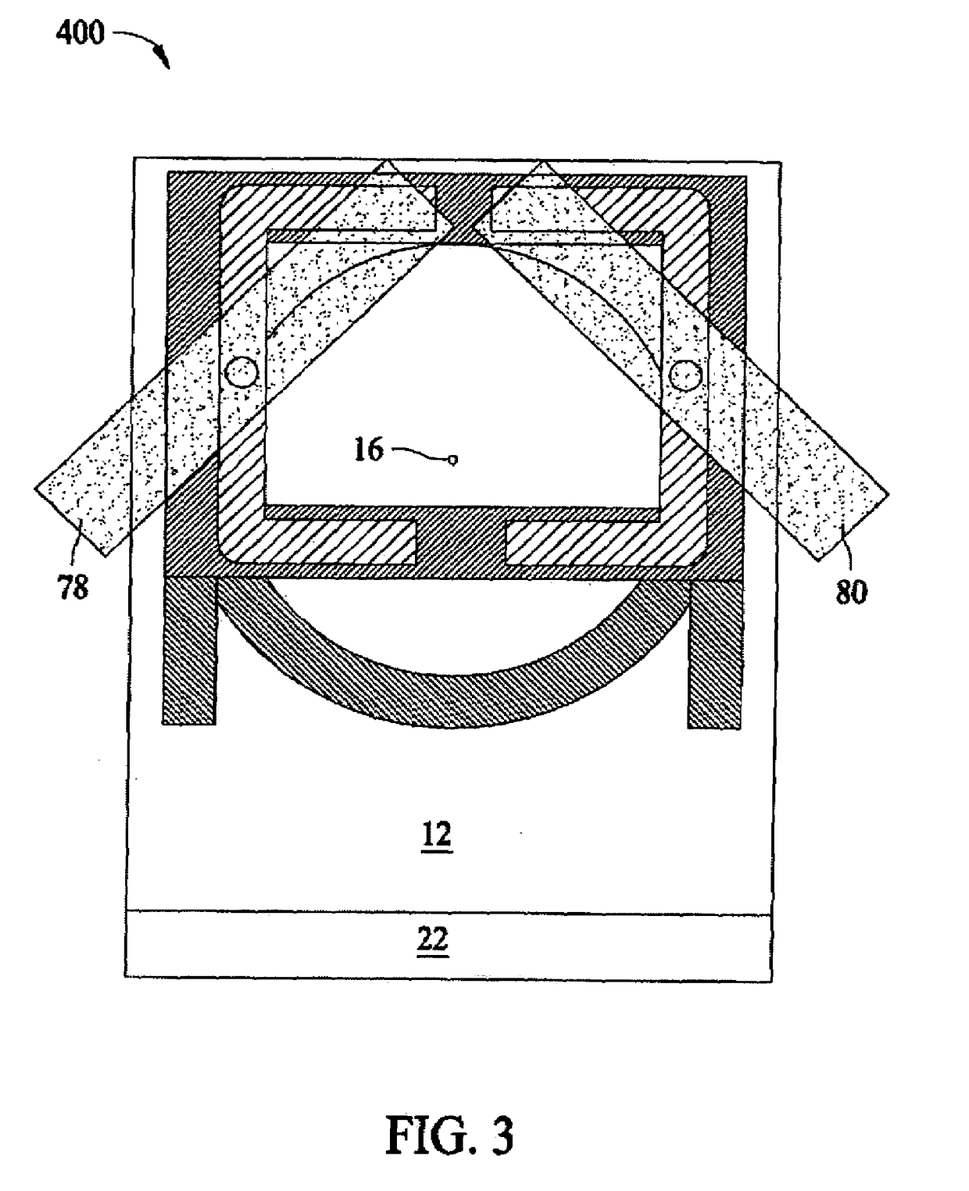
FIG. 3 is a front elevation view of the nuclear medicine imaging system shown in FIG. 1 provided in an L-mode configuration.

FIG. 3 is a front elevation view of the nuclear medicine imaging system 10 (shown in FIG. 1) provided in an L-mode configuration 400. In the L-mode configuration 400, the nuclear medicine imaging system 10 may be used, for example, for a cardiac imaging scan wherein the gamma cameras 78 and 80 are oriented orthogonally with respect to each other. This orthogonal orientation may be provided by swiveling and locking each of the gamma cameras 78 and 80 at a forty-five degree angle. Such orientation facilitates completing a one hundred eighty-degree data set collection by rotating the gamma cameras 78 and 80 less than approximately one hundred eighty degrees about the longitudinal axis 16.

Figure 4:
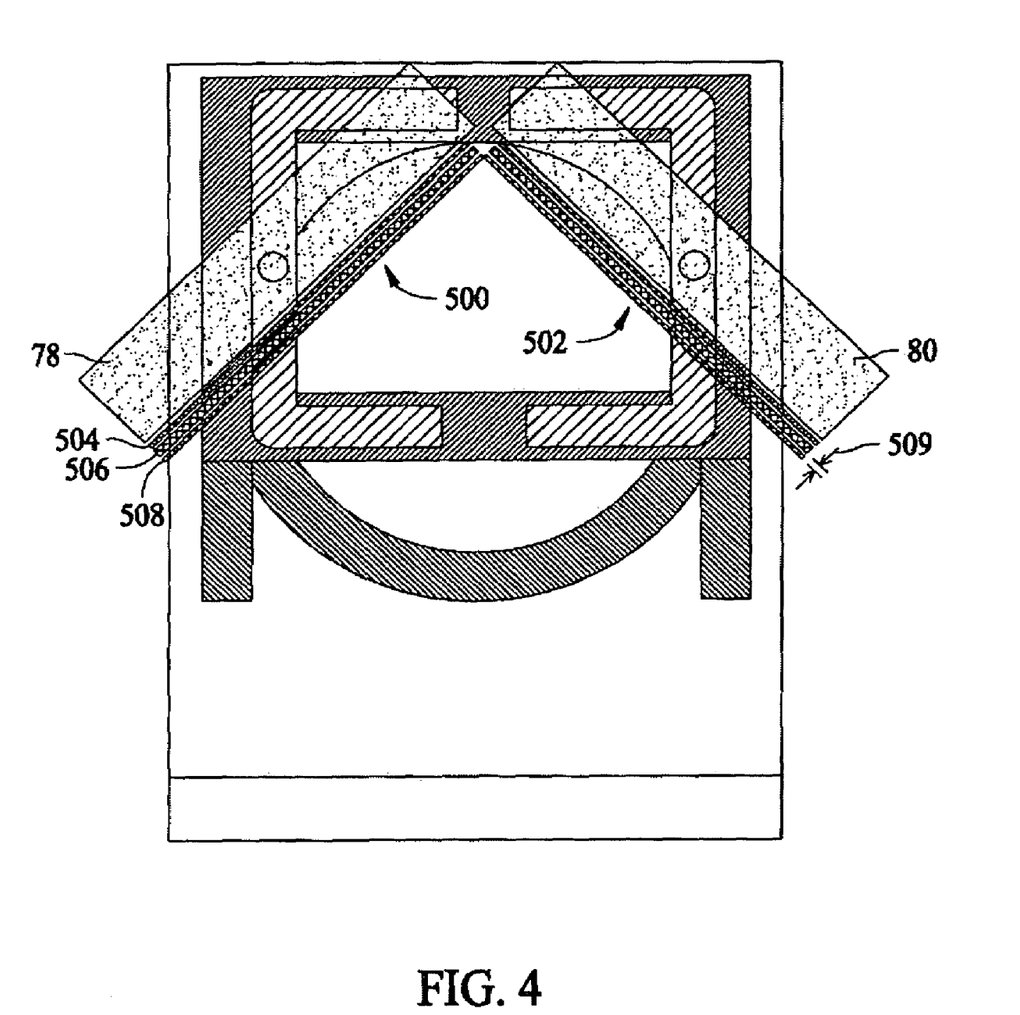
FIG. 4 is a front elevation view of another embodiment of the nuclear medicine imaging system shown in FIG. 1 provided in an L-mode configuration.

FIG. 4 is a front elevation view of the nuclear medicine imaging system 10 (shown in FIG. 1) again provided in the L-mode configuration 400. The nuclear medicine imaging system 10, in this embodiment, includes a first proximity sensor system 500 associated with the gamma camera 78 and a second proximity sensor system 502 associated with the gamma camera 80. In the exemplary embodiment, each proximity sensor system 500 and 502 includes a plurality of sensors, for example, three sensor elements. In alternative embodiments, the proximity sensor systems 500 and 502 may include more or less than three sensor elements. In particular, a pressure sensitive safety device 504 of each proximity sensor system 500 and 502 may be configured to deactivate automatic control of the moving parts of the nuclear medicine imaging system 10, for the example rotor 28, the lateral frame 44, the first radial member 62 and the second radial member 64, and the rotation of the gamma cameras 78 and 80 about the pivot joint 72 and the pivot joint 76, respectively, when the pressure sensitive safety device 504 contacts a subject (not shown in FIG. 5) being scanned. After the pressure sensitive safety device 504 detects contact with the subject or other object, the nuclear medicine imaging system 10 stops all moving parts of the nuclear medicine imaging system 10. Thereafter, control of the moving parts may be restricted to manual control and motion that may bring the gamma camera 78 and/or 80 closer to the subject being scanned may be restricted, even in manual control, until contact between pressure the sensitive safety device 504 and the subject is removed. It should be noted that the proximity sensor systems 500 and 502 may be implemented and controlled in different manners, including, for example, as described in U.S. Pat. No. 5,486,700, entitled "Proximity Controls for Gamma Camera," the entire disclosure of which is hereby incorporated by reference herein in its entirety.

A near proximity sensor 506 may be configured to stop the motion of the moving parts in the direction toward the subject. In an exemplary embodiment, the near proximity sensor 506 is a row of light emitting diodes (LED) and photo-diodes extending along opposite edges of the face of the gamma cameras 78 and 80 that extend approximately one centimeter (cm) from the pressure sensitive safety device 504. A far proximity sensor 508 may be configured to stop the motion of moving parts away from the subject. In an exemplary embodiment, the near proximity sensor 506 and the far proximity sensor 508 define an optimum distance range 509 to facilitate operation of the gamma cameras 78 and 80. In an exemplary embodiment, the far proximity sensor 508 is a row of LEDs and photo-diodes extending along opposite edges of the face of the gamma cameras 78 and 80 that extend approximately two centimeters from the pressure sensitive safety device 504. In an automatic body-contouring mode of operation, the movement of moving parts in a direction away from the subject is not stopped or restricted by the near proximity sensor 506 and the movement of moving parts in a direction toward the subject is not stopped or restricted by the far proximity sensor 508. The proximity sensor system 502 is configured similarly to the proximity sensor system 500. It should be noted the positioning of the sensors and the relative locations and distances between the sensors may be modified as desired or needed.

Figure 5:
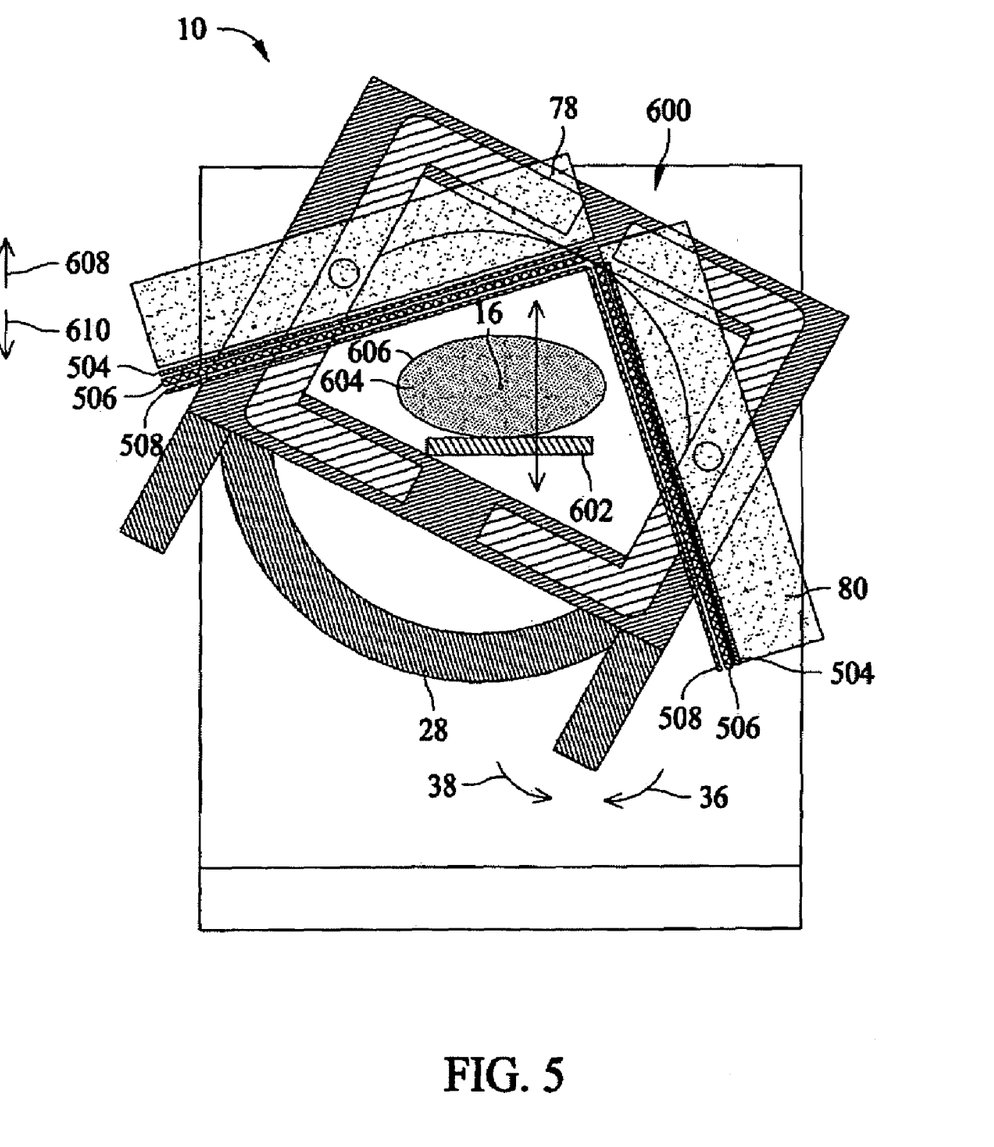
FIG. 5 is a front elevation view of the nuclear medicine imaging system shown in FIG. 1 in an exemplary one of a plurality of scan positions.

FIG. 5 is a front elevation view of the nuclear medicine imaging system 10 (shown in FIG. 1) in an exemplary scan position 600 that is one of a plurality of scan positions. The nuclear medicine imaging system 10 includes a patient table 602 upon which a subject 604 to be scanned, for example a human patient, may be positioned. The subject 604 is generally positioned such that a region of interest 606, for example, a heart, is substantially aligned with the longitudinal axis 16. To facilitate maintaining the gamma cameras 78 and 80 in relatively near proximity to the region of interest 606, the patient table 602 may be configured to be moved in a table up direction 608 and a table down direction 610 with respect to the gantry 12. The position 600 is illustrated with the gamma cameras 78 and 80 oriented in the L-mode configuration 400 (shown also in FIGS. 3 and 4) and the rotor 28 rotated in the direction 36. As illustrated, none of the first and second proximity sensor systems 500 and 502 are close enough to the subject 604 to be actuated. Movement of the patient table 602 may be subject to controls and restrictions similar to the moving parts of the nuclear medicine imaging system 10 such that when the pressure sensitive safety device 504 is actuated, motion of the patient table 602 may be stopped and only permitted to move in a direction that moves the subject 604 away from the gamma cameras 78 and 80 using manual control and automatic control may be suspended. In an exemplary embodiment, when the nuclear medicine imaging system 10 is in an L-mode configuration, the patient table 602 is maintained in a fixed position.

During an imaging scan, for example, but not limited to a SPECT imaging scan, the gamma cameras 78 and 80 may be controlled to rotate about the outer periphery of the subject 604. The rotation may be controlled by controlling the rotation of the rotor 28 and is generally controlled to provide step movement, for example, of approximately three degrees from one imaging position to the next. Accordingly, the subject 604 may be viewed by the gamma cameras 78 and 80 from a plurality of imaging positions extending, for example, one hundred eighty degrees, three hundred sixty degrees, or in continuous rotation about the axis 16.

Specifically, when a one hundred eighty degree scan of the subject 604 is performed, the gamma cameras 78 and 80 may be set in the L-mode configuration 400 (shown in FIGS. 3 and 4) and the rotor 28 is controlled to scan ninety degrees about the subject 604. To utilize automatic body-contouring of the subject 604 during a scan in the L-mode configuration 400, the patient table 602 may be substantially centered within the bore 14 and maintained in such position during the scan. The lateral frame 44 may be positioned to a maximum extent of travel in the lateral in direction 304, and the Radial 1 movement and the Radial 2 movement are used independently to facilitate achieving an optimal proximity of the gamma cameras 78 and 80 with respect to the subject 604.

The proximity sensor systems 500 and 502 detect the position of each of the gamma cameras 78 and 80, respectively, with respect to the subject 604 during the scan. Table 1 below illustrates exemplary actions of an automatic body-contouring method for each possible state of the near proximity sensor 506 and the far proximity sensor 508 for each of the proximity sensor systems 500 and 502.

TABLE 1

| State | Near proximity sensor 506 | Far proximity sensor 508 | Pressure sensitive safety device 504 | Action |
| --- | --- | --- | --- | --- |
| Near proximity | Blocked | Blocked | No contact | Move respective radial member out |
| OK | Not blocked | Blocked | No contact | Do not move |
| Far proximity | Not blocked | Not blocked | No contact | Move respective radial member in |
| Error | Blocked | Not blocked | No contact | Stop all motion, Report "error" |
| Error | X | X | Contact | Stop all motion, Report "error" |

It should be noted that an "X" indicates any condition. Further, when any of the near proximity and far proximity sensors 506 and 508, or the pressure sensitive safety device 504 indicates "error," movement stops and only motion away from the subject 604 is permitted. Each motion axis also may include a limit switch (not shown), indicating an end of travel (except for the rotation of the rotor 28). For example, the limit switches associated with travel the Radial-1 in and out directions 66 and 67, and the Radial-2 in and out directions 68 and 69 limit the sideways motion described herein.

In operation, and for example, when both of the near proximity sensor 506 and the far proximity sensor 508 for the gamma camera 78 and/or the gamma camera 80 is blocked, this condition indicates to the nuclear medicine imaging system 10 that the respective gamma camera 78 and/or 80 is in near proximity with respect to the subject 604 (e.g., too near the subject 604). In this state the nuclear medicine imaging system 10 controls the respective first radial member 62 or second radial member 64 (shown in FIG. 1) to move in the respective Radial-1 out direction 66 and/or Radial-2 out direction 69. A state of the near proximity sensor 506 and the far proximity sensor 508 in which neither the near proximity sensor 506 nor the far proximity sensor 508 are blocked indicates to the nuclear medicine imaging system 10 that the respective gamma camera 78 and/or 80 is in far proximity with respect to subject 604 (e.g., too far away from the subject 604). In this state the nuclear medicine imaging system 10 controls the respective first radial member 62 or second radial member 64 to move in the respective Radial-1 in direction 67 and/or Radial-2 in direction 68. A state in which the near proximity sensor 506 is not blocked and the far proximity sensor 508 is blocked indicates to the nuclear medicine imaging system 10 that the respective gamma camera 78 and 80 is positioned within a distance range 509 from subject 604 (e.g., acceptable imaging range). In this state the nuclear medicine imaging system 10 may begin data collection from the gamma cameras 78 and 80 from the view to which the rotor 28 is rotated. A state in which the near proximity sensor 506 is blocked and the far proximity sensor 508 is not blocked or when the pressure sensitive safety device 504 is contacted indicates to the nuclear medicine imaging system 10 that all movement should be stopped because of an "error" condition or potential dangerous condition, respectively.

Figure 6:
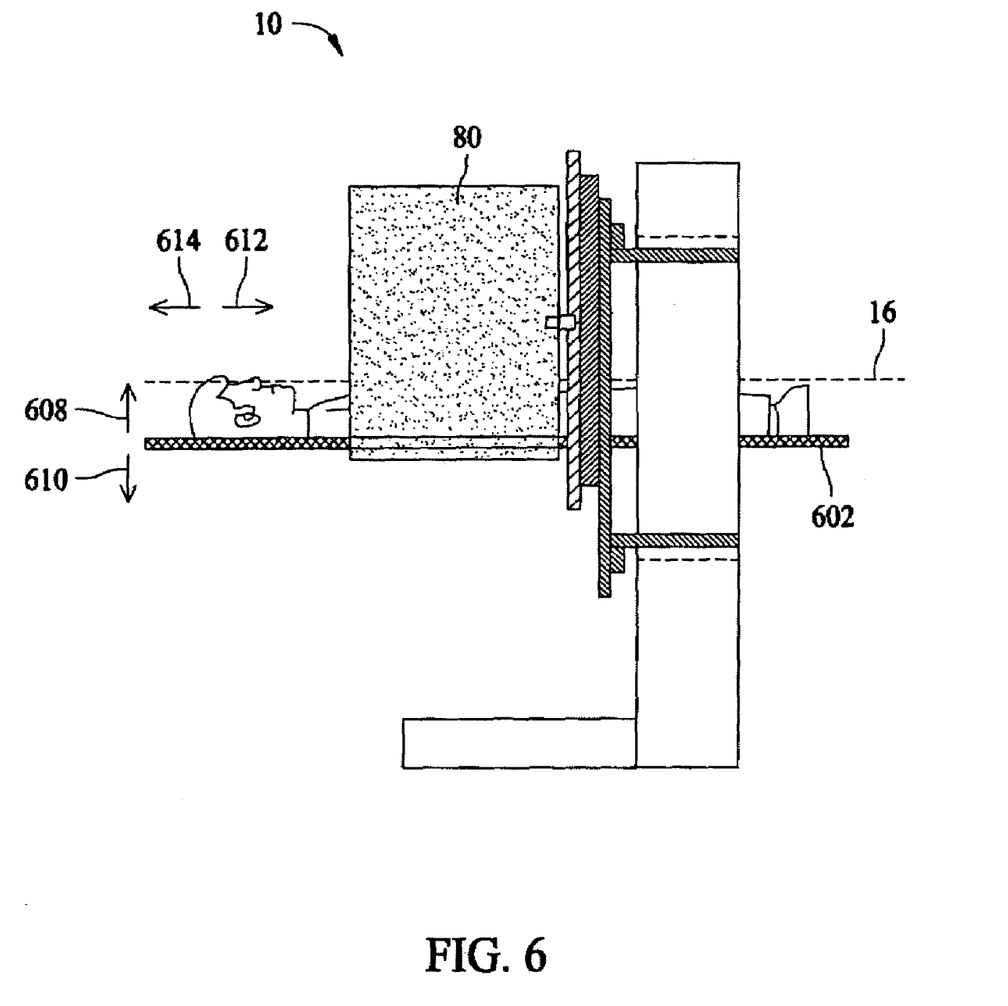
FIG. 6 is a side elevation view of the nuclear medicine imaging system shown in FIG. 5 with a patient being examined.

FIG. 6 is a side elevation view of the nuclear medicine imaging system 10 (shown in FIG. 5). The patient table 602 also may be configured to be moved in a direction parallel to the longitudinal axis 16 such as a table in direction 612 and a table out direction 614 with respect to the gantry 12.

Figure 7:
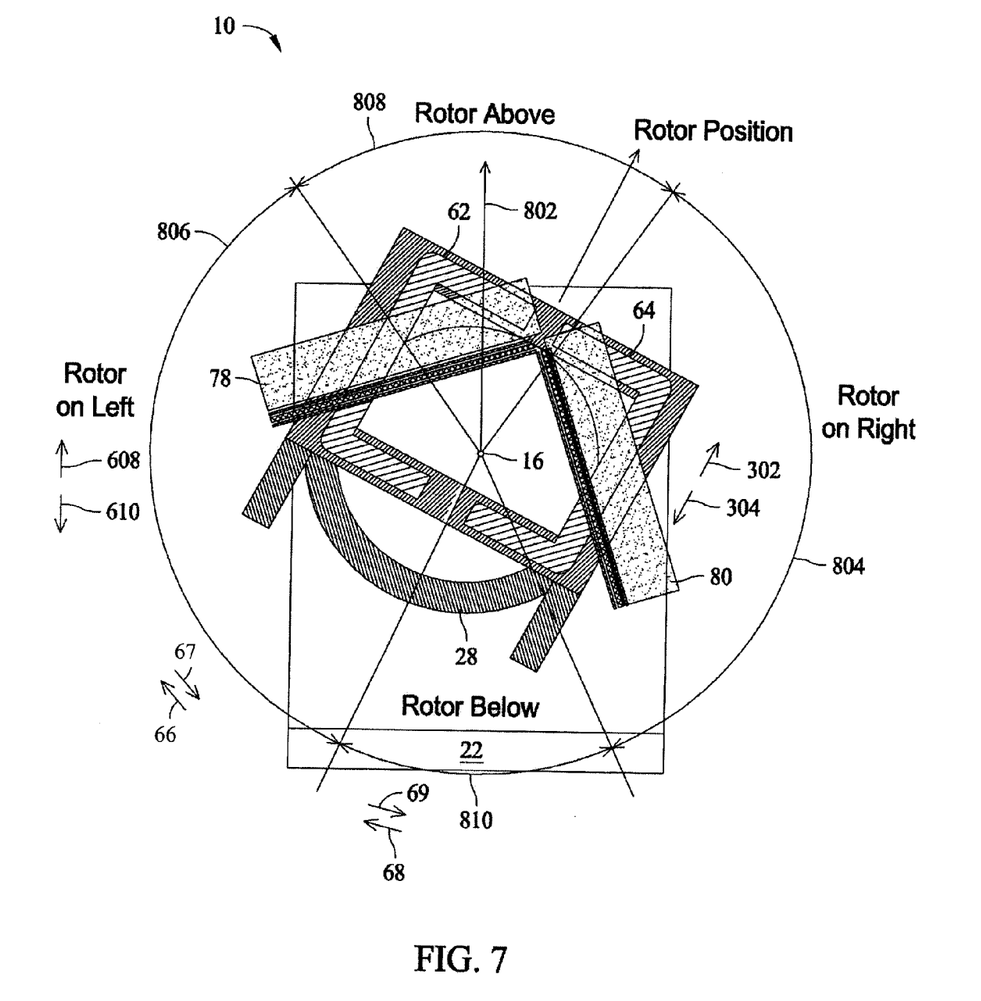
FIG. 7 is a front elevation view of gamma cameras oriented in an L-mode configuration in an exemplary scan position in accordance with an embodiment of the present invention.

FIG. 7 is a front elevation view of the nuclear medicine imaging system 10 (shown in FIG. 1) provided in the L-mode configuration 400. In the exemplary embodiment, the gamma cameras 78 and 80 are configured to pivot independently and the first radial member 62 and the second radial member 64 are configured to translate in and out independently. A reference axis 802 is selected to point away from the foot portion 22 and pass through the longitudinal axis 16. Positions of the rotor 28 rotation from the axis 802 may be referenced from the reference axis 802. The rotation of the rotor 28 may be divided into a plurality of sectors for providing input to the automatic body-contouring method. The method then may modify an output with respect to the position of the rotor 28. It should be noted that the division of the rotor position to sectors may be divided in other than ninety-degree sections and may be other than symmetric sections. The sectors include a rotor on right sector 804, a rotor on left sector 806, a rotor above sector 808, and a rotor below sector 810.

The plurality of degrees of freedom of movement permitted by the nuclear medicine imaging system 10 allows the automatic body-contouring method to control three independent motions in the L-mode configuration 400. Further, by combining two radial motions, a shift motion may be provided as described in more detail below. The table up direction 608, the table down direction 610, the lateral out direction 302, the lateral in direction 304, the Radial-1 out direction 66, the Radial-1 in direction 67, the Radial-2 in direction 68, and the Radial-2 out direction 69 (shown in FIGS. 1 through 6) may be controlled independently with respect to each other. Movement of the first radial member 62 and the second radial member 64 in combination moves the gamma cameras 78 and 80 in a direction that is perpendicular to the movement in the lateral in or lateral out direction. For example, the gamma cameras 78 and 80 may be moved sideways right by combining the Radial-1 in direction 67 and the Radial-2 out direction 69. Similarly, the gamma cameras 78 and 80 may be moved sideways left by combining the Radial-1 out direction 66, and the Radial-2 in direction 68. It should be noted that the table up direction 608 and the table down direction 610 may be used only when at least one of the lateral movement and the radial movement has reached a travel limit. Limiting table motion to a minimum amount necessary to accomplish automatic body-contouring is provided, for example, for patient comfort during a scan.

In operation, various embodiments of the automatic body-contouring method also may include a hierarchy of motions, for example, when at least one of the gamma cameras 78 and 80 is in near proximity, the automatic body-contouring method initiates a motion that attempts to move the gamma camera to an OK state wherein the face of the gamma camera is within the distance range 509 with respect to the subject 604. If a travel limit is reached while attempting to move the gamma camera into the OK state, the automatic body-contouring method may initiate a motion that attempts to move the patient table 602 to a position that positions the gamma camera into the OK state. If at least one of the gamma cameras 78 and 80 is in far proximity (and the other gamma camera is not in near proximity), the automatic body-contouring method initiates a motion that attempts to move the gamma camera to an OK state. If a travel limit is reached while attempting to move the gamma camera into the OK state, the automatic body-contouring method may initiate a motion that attempts to move the patient table 602 to a position that positions the gamma camera into the OK state. If both the gamma cameras 78 and 80 are in an OK state, the automatic body-contouring method does not initiate motion to move the gamma cameras 78 and 80 with respect to the subject 604.

It should be noted that if any of the near proximity and far proximity sensors 506 and 508, or pressure sensitive safety device 504 are in an "error" state, or travel limits have been reached, such that no motion is permitted, the automatic body-contouring method stops all motion (including rotor rotation) and an alarm, such as an audible or visual alarm, may be activated. During any movements, moving the gamma cameras 78 and 80 away from the subject 604, for example, due to a gamma camera being in a near proximity position with respect to the subject 604, takes priority over moving the gamma cameras 78 and 80 towards the subject 604, for example, due to a gamma camera being in a far proximity position with respect to the subject 604.

Various embodiments provide a method for automatic body-contouring Table 2 below illustrates exemplary sensor conditions used to control the automatic body-contouring method, and in particular, the actions performed (e.g., camera movements) based on the sensed conditions.

TABLE 2

| First proximity sensor system 500 | Second proximity sensor system 502 | Action (may include hierarchy of motions) |
|---|---|---|
| Far Proximity | Far Proximity | Move lateral in |
| OK | OK | Do not move |
| OK | Far | Shift Left |
| Near Proximity | Proximity | |
| Far Proximity | OK | Shift right |
| | Near Proximity | |
| Near Proximity | Near Proximity OK | Move lateral out |
| Near Proximity OK | Near Proximity | Move lateral out |
| Error | X | Stop all motion, report error |
| X | Error | Stop all motion, report error |

The first two columns of Table 2 identify a set of conditions or indications from the sensors of the nuclear medicine imaging system 10, and in particular, from the first proximity sensor system 500 and the second proximity sensor system 502, respectively. The third column of Table 2 indicates a corresponding action command that is, for example, transmitted by the automatic body-contouring method to control the speed and direction of the moving parts of the nuclear medicine imaging system 10.

Table 2 may be configured and stored as a look-up table in a memory of a motion controller portion (not shown) of the nuclear medicine imaging system 10 that receives indications of the proximity of the gamma cameras 78 and 80 to the subject 604 and processes instructions to transmit commands that control the moving parts of the nuclear medicine imaging system 10. For example, the first row of Table 2 illustrates the state wherein both the first proximity sensor system 500 and the second proximity sensor system 502 indicate that each of corresponding gamma cameras 78 and 80, respectively, are too far from the subject 604. For this set of conditions/states of the first proximity sensor system 500 and the second proximity sensor system 502, the automatic body-contouring method initiates movement commands that cause the gamma cameras 78 and 80 (in the L-mode configuration) to move in the lateral in direction 304 (shown in FIG. 1). It should be noted that other conditions not shown in Table 2 may be considered when determining an action to perform and a control to initiate. For example, the condition of the pressure sensitive safety device 504, the rotor position and the travel limits, which may halt operation of one or more of the moving parts and override the normal command to be initiated may be considered. Thus, for example, if contact has been made with the pressure sensitive safety device 504 then all movement in the system is halted even if the first proximity sensor system 500 and the second proximity sensor system 502 are in the conditions indicated in the first row of Table 2.

Figure 8:
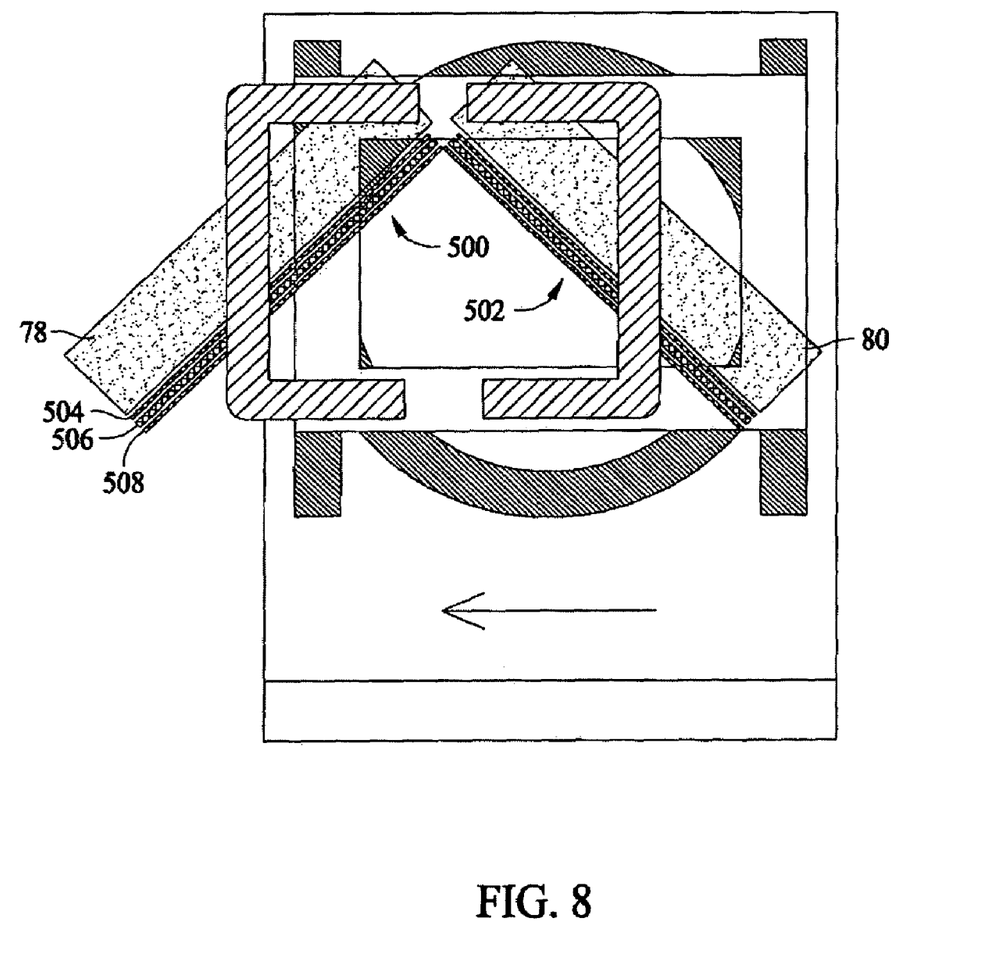
FIG. 8 is a front elevation view of a nuclear medicine imaging system constructed in accordance with an embodiment of the present invention in an L-mode configuration illustrating a shift movement.
Figure 9:
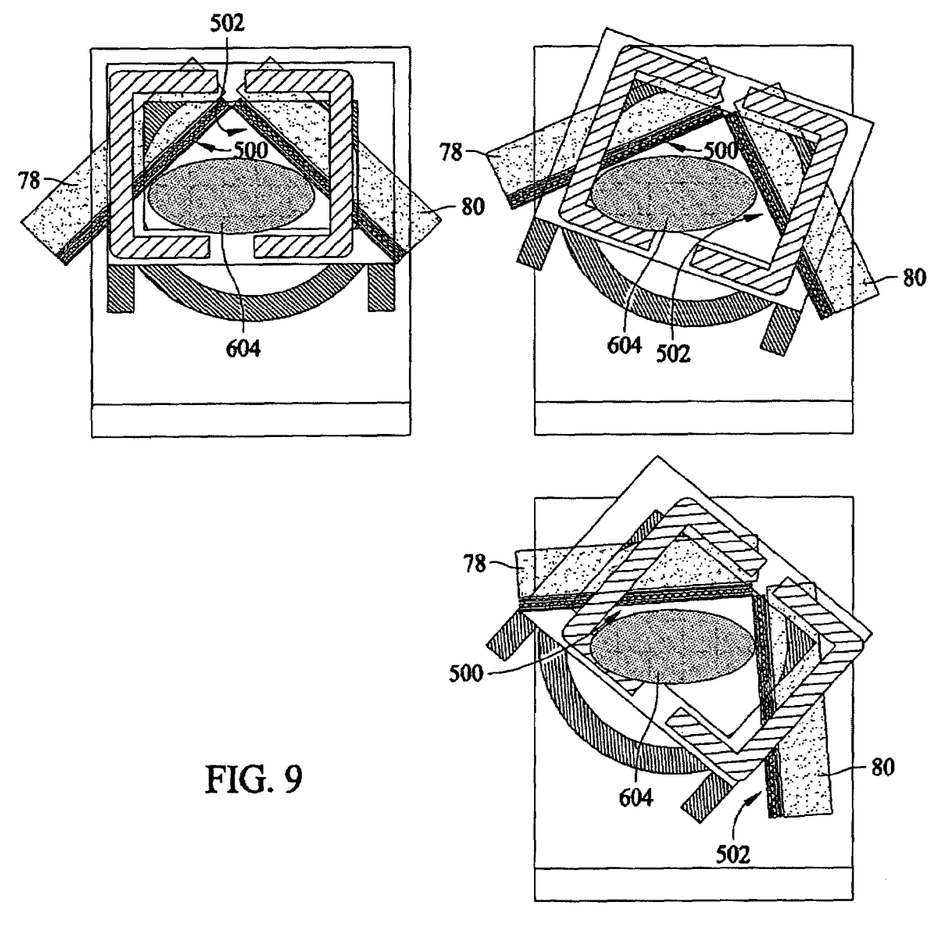
FIG. 9 are front elevation views of a nuclear medicine imaging system constructed in accordance with an embodiment of the present invention in an L-mode configuration illustrating combined movements.

As another example, and as shown in Table 2, if the first proximity sensor system 500 indicates that the position of the gamma camera 78 is in an OK state (e.g., acceptable for acquiring data) and the second proximity sensor system 502 indicates that the position of the gamma camera 80 is in a far proximity state (e.g., too far from the subject 604), as indicated in the first and second columns of Table 2, respectively, the automatic body-contouring method initiates movement commands that cause the gamma cameras 78 and 80 (in the L-mode configuration) to shift left (e.g. move sideways left) as shown in FIG. 8 and indicated by the arrow. Because the nuclear medicine imaging system 10 is configured to allow shifting movement, even when one of the gamma cameras 78 or 80 is positioned at an acceptable distance from the subject 604, the gamma cameras 78 and 80 are moved until both are an acceptable distance, as indicated by an OK state, from the subject 604. For example, a shift left operation is performed by combining movement in the Radial-1 in direction 67 and Radial-2 out direction 69 and a shift right operation is performed by combining movement in the Radial-1 out direction 66 and the Radial-2 in direction 68. This combined movement may be performed, for example, by simultaneous operation of two motors of the nuclear medicine imaging system 10 and results in close examination around the entire subject 604 as the nuclear medicine imaging system 10 rotates the gamma cameras 78 and 80 as shown in FIG. 9 because the automatic body-contouring method moves the gamma cameras 78 and 80 until both are an acceptable distance, as indicated by an OK state, from the subject 604 at each examination point.

Other rows and columns of Table 2 illustrate the output of the automatic body-contouring method for various combinations of inputs from the first proximity sensor system 500 and the second proximity sensor system 502. The rotation of the rotor 28 (shown in FIG. 1) from a scanning position to a next scanning position may cause any of the various inputs to change between scanning positions, such that the gamma cameras 78 and 80 circumscribe a path extending from the subject 604 that is a distance away from the subject 604 that corresponds to the settings of the near proximity sensor 506 and the far proximity sensor 508.

In operation, and referring again to FIGS. 1 and 5, during continuous rotation of the rotor 28, for example, when a continuous scan mode is selected, the automatic body-contouring method continuously controls the movement of the moving parts of the nuclear medicine imaging system 10, including blocking the motion of the rotor 28. For example, when a "step and shoot" scan mode is selected, the rotor 28 rotates a predetermined number of degrees between each view position, for example, approximately one degree to approximately four degrees, and stops rotation for a predetermined period, such as, approximately five seconds to approximately thirty seconds, or for a predetermined number of gamma camera counts, to acquire data from a view.

In one embodiment, the nuclear medicine imaging system 10 controls movement of the first radial member 62 or the second radial member 64 and the lateral frame 44 to initiate movement away from the subject 604 during rotation of the rotor 28. When the rotation stops, the automatic body-contouring method may then permit the movement of the first radial member 62, the second radial member 64 and the lateral frame 44 towards the subject 604 to achieve a best proximity position and stop for the duration of the view acquisition. In a further embodiment, when the rotation is stopped, the automatic body-contouring method may be configured to move the gamma cameras 78 and 80 in only the away directions such that the gamma cameras 78 and 80 do not follow the breathing of the subject 604, but will maintain best proximity for the inhale patient posture.

The nuclear medicine imaging system 10 also may include position encoders (not shown) for each of the rotor 28, the lateral frame 44, the first radial member 62 or the second radial member 64, the pivot joints 72 and 76, and the patient table 602. The automatic body-contouring method may transmit to an acquisition processor (not shown) within the nuclear medicine imaging system 10 or located remotely for each degree of freedom the configuration and position of the gamma cameras 78 and 80 based on the encoders. The configuration and position information for the gamma cameras 78 and 80 may be used to determine a relative direction of detected photons to coordinates of the subject 604. For example, in one embodiment, the configuration and position information for the gamma cameras 78 and 80 is transmitted to the acquisition processor periodically, for example, every ten milliseconds. In an alternative embodiment, only configuration and position changes of the gamma cameras 78 and 80 are transmitted. It should be noted that in the L-mode configuration the configuration information is unchanged. In another embodiment, the position of the patient table 602 may be programmed for a predetermined location depending on a type of scan to be performed. For example, different home or starting positions of the patient table 602 for a child, a head, an adult, and an obese patient may be preset and selected when desired by the operator. Moreover, subject contour information facilitates improving image reconstruction. For example, the position encoders may transmit gamma camera location information to an image reconstruction method such that positional errors may be reduced during reconstruction.

It should be noted that additional controls or operations may be provided as part of the automatic body-contouring method. For example, the automatic body-contouring method may control the movement of the table 602 relative to the first and second gamma cameras 78 and 80 as described in more detail herein.

It is contemplated that the benefits of the various embodiments of the present invention accrue to all imaging systems, such as, for example, but not limited to, nuclear medicine imaging systems, PET, SPECT and dual-modality imaging systems.

The above-described embodiments of automatic body-contouring imaging systems provide a cost-effective and reliable means for examining a patient. More specifically, the imaging system includes a plurality of gamma cameras each having multiple degrees of freedom of movement, such that, during a scan, the gamma cameras may be automatically controlled to contour the body of a patient or subject to reduce the distance between the region of interest and the gamma camera sensitive face. As a result, an imaging system is provided that facilitates improving the resolution of the gamma cameras.

Exemplary embodiments of automatic body-contouring imaging systems are described above in detail. The automatic body-contouring imaging system components illustrated are not limited to the specific embodiments described herein, but rather, components of each automatic body-contouring imaging system may be utilized independently and separately from other components described herein. For example, the automatic body-contouring imaging system components described above may also be used in combination with other imaging systems.

A technical effect of the systems and methods described herein includes facilitating minimizing the distance between an organ of interest and an imaging system detector during an automatic imaging scan of a subject, and therefore facilitating reducing operator input to the scanning procedure and reducing the time necessary to perform a scan while improving the resolution of the imaging system.

While the invention has been described in terms of various specific embodiments, those skilled in the art will recognize that the invention can be practiced with modification within the spirit and scope of the claims.

What is claimed is:

1. A method of imaging a patient using an imaging system, said method comprising:
    rotating a first detector and a second detector about a subject, wherein the first and second detectors comprise radiation detectors configured in an L-mode configuration;
    determining a distance of the first detector and the second detector from the subject; and
    automatically adjusting a position of the first detector and the second detector to within a predetermined distance range if the determined distance of one of the first and second detectors is not within the predetermined distance range, wherein the automatically adjusting the position comprises performing a combined shift movement, the combined shift movement combining a radial movement of the first detector and a radial movement of the second detector to form the combined shift movement, the combined shift movement simultaneously moving the first and second detectors relative to a reference point within the subject such that the first and second detectors follow a contour of the subject while maintaining the L-mode configuration.

2. A method in accordance with claim 1 wherein automatically adjusting the position comprises performing the combined shift movement operation including at least two of a lateral out movement, a lateral in movement, a first radial out movement, a first radial in movement, a second radial out movement, and a second radial in movement.

3. A method in accordance with claim 1 wherein the combined shift movement comprises shifting the first detector in a first radial direction toward the reference point and shifting the second detector in a second radial direction away from the reference point.

4. A method in accordance with claim 1 wherein the subject is supported by a table and further comprising maintaining a position of the table during the rotating and adjusting.

5. A method in accordance with claim 1 wherein the imaging system comprises a bore having a longitudinal axis extending therethrough, the reference point located along the longitudinal axis.

6. A method in accordance with claim 1 further comprising receiving distance information from a first proximity system associated with each of the first and second detectors to determine the distance of the first detector and the second detector from the subject.

7. A method in accordance with claim 6 further comprising receiving distance information from a second proximity system associated with each of the first and second detectors to determine the distance of the first detector and the second detector from the subject, the first proximity system determining a near proximity state and the second proximity system determining a far proximity state.

8. A method in accordance with claim 1 further comprising halting rotation of the first detector and the second detector upon detecting an error state.

9. A method in accordance with claim 1 wherein the subject is a human patient.

10. A method of moving first and second detectors of an imaging system, said method comprising:
    positioning the first and second detectors in an L-mode configuration;
    moving the first detector in a first radial direction relative to a reference point when the first detector is in the L-mode configuration; and
    moving the second detector in a second radial direction relative to the reference point when the second detector is in the L-mode configuration such that the first and second detectors follow a contour of the subject, the first and second radial directions defining a combined shift motion of the first and second detectors, the combined shift motion combining a radial movement of the first detector and a radial movement of the second detector, wherein the first radial direction is opposite to the second radial direction and the first and second detectors are simultaneously moved in the respective first and second radial directions while maintaining the L-mode configuration.

11. A method in accordance with claim 10 wherein the first radial direction is a radially out direction relative to the reference point and the second radial direction is a radially in direction relative to the reference point.

12. A method in accordance with claim 10 wherein the movement of the first and second detectors is over an equal distance.

13. A method in accordance with claim 10 wherein the first radial direction of the first detector is away from the reference point and the second radial direction of the second detector is toward the reference point.

14. A method in accordance with claim 10 wherein the shift motion is performed when one of the first and second detectors is at a distance greater than a predetermined distance range from a subject.

15. A method in accordance with claim 10 wherein the imaging system comprises a bore having a longitudinal axis extending therethrough, the longitudinal axis comprising the reference point.

16. An imaging system comprising:
    a gantry with a bore therethrough, the bore comprising a longitudinal axis;

a rotor rotatably coupled to said gantry, said rotor configured to rotate about the longitudinal axis of said bore;

a transaxial movement assembly coupled to said rotor;

first and second detectors rotatably coupled to said transaxial movement assembly such that said first and second detectors can be relatively positioned in an L-mode configuration; and a processor operatively connected to the transaxial movement assembly, said processor controlling said transaxial movement assembly to move said first and second detectors in a combined shift motion relative to said gantry, when said first and second detectors are in the L-mode configuration, by simultaneously moving the first and second detectors in opposite first and second radial directions, respectively, relative to the longitudinal axis, the combined shift motion combining a radial movement of the first detector and a radial movement of the second detector.

17. An imaging system in accordance with claim 16 wherein said transaxial movement assembly comprises a radial translation member coupled to said rotor, said radial translation member configured to move in a first axis that is orthogonal to the longitudinal axis, said radial translation member configured to move said first and second detectors in the shift motion.

18. An imaging system in accordance with claim 16, wherein the first radial direction of the first detector is toward the longitudinal axis and the second radial direction of the second detector is away from the longitudinal axis.

19. An imaging system in accordance with claim 16, wherein the first radial direction of the first detector is a radially in direction relative to the longitudinal axis and the second radial direction of the second detector is a radially out direction relative to the longitudinal axis.

20. An imaging system in accordance with claim 16 wherein said transaxial movement assembly comprises:

a lateral translation member coupled to said rotor, said lateral translation member configured to move in a first axis that is orthogonal to the longitudinal axis; and a radial translation member coupled to said lateral translation member, said radial translation member configured to move in a second axis that is orthogonal to the longitudinal axis and the first axis.

* * * * *